United States Patent [19]

Verduyn et al.

[11] Patent Number: 4,833,879
[45] Date of Patent: May 30, 1989

[54] TURBO-ENGINE GUARD

[76] Inventors: Norbertus Verduyn, Hoge Kleiweg 5, 3832 RJ Leusden; Gerard de Greef, Oude Tempellaan 8, 3769 IB Soesterberg, both of Netherlands

[21] Appl. No.: 14,019

[22] Filed: Feb. 12, 1987

[30] Foreign Application Priority Data

Feb. 12, 1986 [NL] Netherlands ............... 8600351

[51] Int. Cl.⁴ ............................................. F02C 7/055
[52] U.S. Cl. ..................................... 60/39.092; 55/306
[58] Field of Search ................... 60/39.092; 55/306; 244/53 B; 415/121 G

[56] References Cited

U.S. PATENT DOCUMENTS

| | | | |
|---|---|---|---|
| 2,931,460 | 4/1960 | McEachern | 55/306 |
| 3,121,545 | 2/1964 | Meletiou | 60/39.092 |
| 3,426,981 | 2/1969 | Allcock | 60/39.092 |
| 4,149,689 | 4/1979 | McDonald | 60/39.092 |

Primary Examiner—Louis J. Casaregola
Attorney, Agent, or Firm—Wigman & Cohen

[57] ABSTRACT

A turbo-engine guard (2) for mounting on the air inlet (1) side of a turbo-engine, particularly of airplanes, comprises guard elements (3) possessing an optimum aerodynamic design. Advantageously the center lines or their extensions of the guard elements intersect or do not intersect each other in one plane. Preferably the guard elements (3) are helically mounted, preferably along several helical lines. Appropriately the guard elements (3) are kept under a tension so that these elements return to their original position after collision. Suitable materials for the guard elements are plastics of the poly-p-phenylene terephtalamide type, carbon fibres, metal or parts being held together by a binder being resistant to temperatures comprised between +150° C. and −50° C. In a preferred embodiment in case of breaking of a guard element 3 in pieces, the resultant parts undergo an approximate shortening, preferably obtained by a spring force introduced into these parts, to a length being less than the distance between the rotating parts of the engine and the location at which this resultant part is kept in position. The resultant parts can also be pulled away from the inflowing air stream by means of a member or construction mounted inside or outside the air inlet and/or inside or outside the element (3) concerned. The guard (2) is at least partially detachable or replaceable.

4 Claims, 3 Drawing Sheets

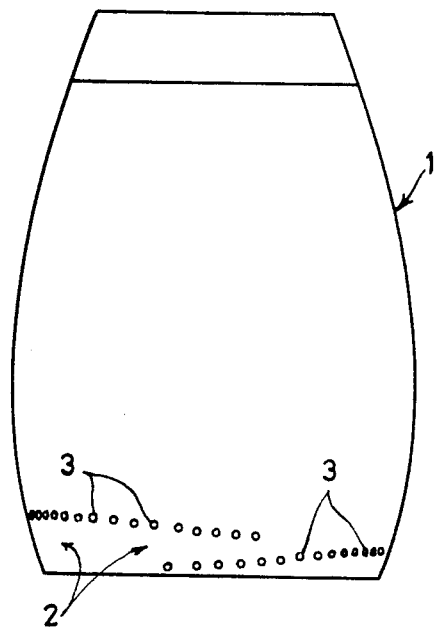
FIG: 1.
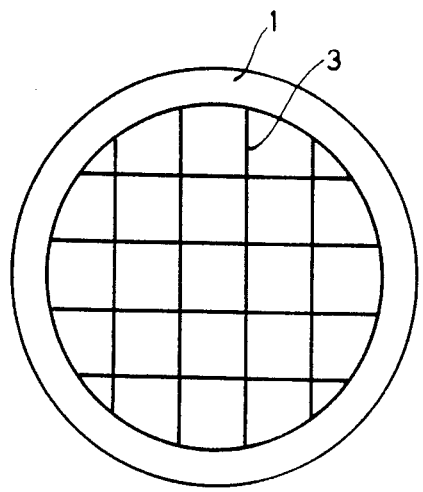
FIG: 2a.
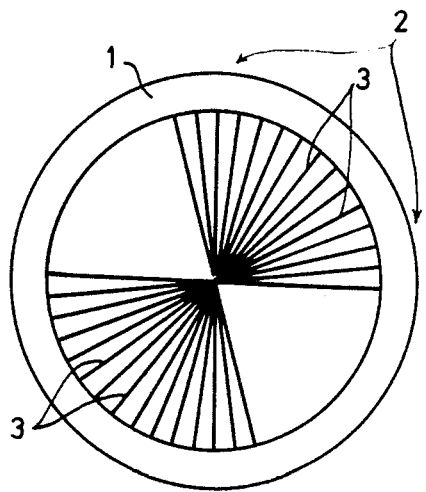
FIG: 2.
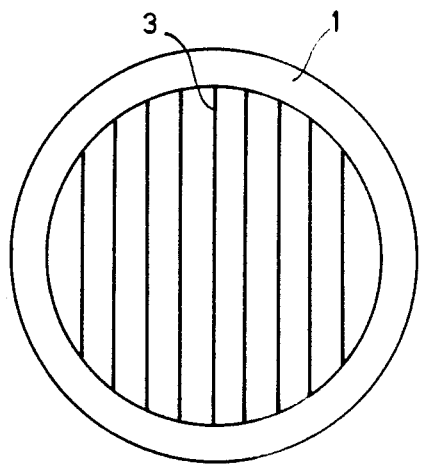
FIG: 2b.

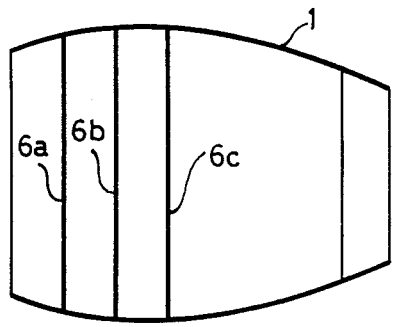
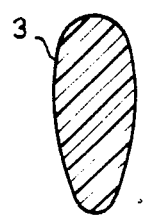
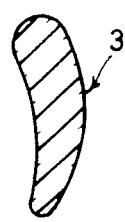
FIG:2c.  FIG:3.  FIG:4.
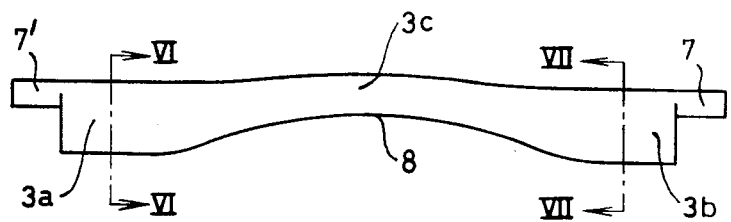
FIG:5.
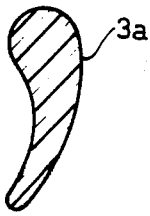
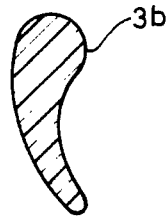
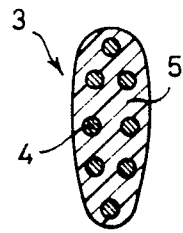
FIG:6.  FIG:7.  FIG:8.

TURBO-ENGINE GUARD

BACKGROUND OF THE INVENTION

The invention relates to a turbo-engine guard for mounting on the air inlet side of a turbo-engine, particularly for aeroplanes.

It is known that air can enter via the air inlet of turbo-engines at a high velocity, it being possible for animals, in particular birds, to enter the engine parts with this air stream. Which are or are not rotating, and in this case can cause damage to these parts.

SUMMARY OF THE INVENTION

The invention seeks to guard a turbo-engine in such a manner that the damage referred to above to engines of this type is prevented or at least substantially limited.

According to the invention the turbo-engine guard comprises guard elements with an aerodynamic design, which is chosen in such a manner that elements or element parts do not have any unacceptable disturbing influence on the air stream which flows along said elements to the turbo-engine to be protected.

By using guard elements of this type having such an aerodynamic design, animals, in particular large birds, can be entirely prevented from coming into contact with the turbo-engine without the guard elements unacceptably influencing the air supply as a result. It is obvious that the animal's body may be torn to pieces by the guard element, but said parts show no noticeable, or only limited damage. The guard elements or their centre lines or the extensions of their centre lines appropriately intersect in one plane.

Such a construction of the guard elements provides an expedient guard, although at the points of intersection the air stream is naturally adversely affected as compared to the influence at the locations without points of intersection.

It may therefore be advisable that the centre lines or the extensions of the centre lines of the guard elements do not intersect in one plane.

This construction provides for a minimum disturbing influence on the air stream.

The guard elements, which may or may not intersect, can very expediently be situated in more than one plane.

A very good guard is obtained in this manner, because the animals, having passed one plane of guard elements, will encounter new guard elements in a subsequent plane and the particular animal will therefore be torn into small pieces or stopped partially or completely.

In a particularly recommendable embodiment the guard elements are arranged, with respect to each other, not in one plane according to one or more helical line patterns. Optimum protection is achieved in this way, because the air flowing in also moves spirally through the air inlet to the engine so that large animals carried along, definitely come into contact with the guard elements.

The guard can be kept under a tension so that these elements after collision with an animal can substantially return to their original shape and state. This will, for example, be possible to take place by providing the elements or parts of elements with a specified spring force in the interior of the elements or outside thereof.

It is particularly advisable that the guard elements are made up, partially or completely, of fibrous and/or foam-like and/or wire-like elements with a stretch and thickness as well as elasticity such that after collision with a live animal, these elements can substantially return to their original shape and state.

This construction can be made, partially or completely, particularly of a plastic, preferably a plastic having properties of plastics of the poly-p-phenylene-terephthalamide type or stronger material which are also sufficiently stretchable and elastic.

These abovementioned constructions result in a particularly good guard and have the advantage that the guard element, after collision with an animal body, can in general take up its original guarding function again directly.

Suitable fibrous, film-like or wire-like components for guard elements of a poly-p-phenyleneterephthalate polyamide type are those of aramide plastics such as "Kevlar®" or "Twaran®" Guard elements constructed of these plastics have the advantage that they are very lightweight and at the same time strong and sufficiently elastic and stretchable.

Guards constructed completely or partially of the abovementioned plastics or corresponding materials at the same time have the advantage that, should one element nevertheless break as a result of a collision, the broken part will remain firmly in place on a fastening point, and the end which has come loose need not cause any serious damage, in spite of possible drag along the compressor blades, in view of the fact that the plastics of which the elements are constructed are nevertheless subject to wear despite the high tensile strength, so that only small parts of such an element can come loose and can pass the remainder of the turbo-engine virtually without causing any damage.

Another essential advantage of the use of plastics mentioned above is to be found in the fact that the elastic properties of such elements make it possible to maintain a very definite air flow in the air inlet of the turbo-engine, because the elements concerned, after a collision with an animal body or a part or parts thereof, can return to their original state without the use of complicated constructional features, and a uniform flow of air via the air inlet side to the turbo-engine can therefore be continuously guaranteed.

The guard elements can also be constructed of metal, carbon fibres or other strong materials.

When metal is used, a broken element may cause damage when a part of this element comes into contact with the rotating part of the turbo-engine, so that it is advisable in this case that, in the event of breakage, the parts can be pulled away from the area of action of the air stream flowing in by means of a member or construction, mounted inside or outside the air inlet and/or inside or outside the element in question, or alternatively these parts are pulled in.

It is likewise possible in the event of an element breaking into pieces for the resulting parts still in place on one side to undergo a suitable shortening to a length which is less than the distance between those parts of the turbo-engine which rotate when the turbo-engine is in operation and the location at which this part is held in position; this shortening can take place for example by winding up spirally the broken element part.

It is advisable that the aerodynamically shaped elements, which will preferably possess a slightly elongate or drop-shaped or arched drop-shaped cross-section, are twistable to a greater or lesser degree about their longitudinal axis; as a result the position of the element, or parts thereof can adjust to the direction of the air stream in a manner such that the air stream is disturbed as little as possible.

A turbo-engine guard according to the invention is preferably mounted so as to be detachable and replaceable.

BRIEF DESCRIPTION OF THE DRAWINGS

The invention will be illustrated through an embodiment by means of the accompanying drawings in which:

FIG. 1 shows diagrammatically a turbo-engine with an air inlet side, in which aerodynamically shaped guard elements according to the invention are mounted in a helical pattern;

FIG. 2 shows a view of a set of such elements;

FIG. 2a shows a view of another set of such elements;

FIG. 2b shows a view of yet another set of such elements;

FIG. 2c shows a longitudinal section of the air inlet in which the guard elements are mounted in several planes;

FIG. 3 shows a cross-section of an aerodynamically shaped element according to the invention;

FIG. 4 shows an arched cross-section of an aerodynamically shaped element according to the invention;

FIG. 5 shows a view of a possible shape of an aerodynamically shaped element according to the invention;

FIG. 6 shows a section along line VI—VI;

FIG. 7 shows a section along line VII—VII;

FIG. 8 shows a section of an element constructed of a number of reinforcing parts, held together by means of a binder;

DETAILED DESCRIPTION OF THE INVENTION

Figure 9:
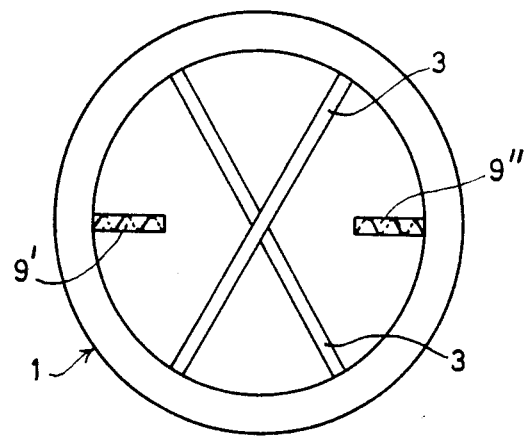
FIG. 9 shows a part of a construction for pulling back an element.

FIG. 1 shows a turbo-engine with an air inlet 1 through which the air required for this power source can flow in.

The air inlet (see FIGS. 1 and 2) is provided with a set 2 of guard elements 3.

As can be seen in FIGS. 1 and 2, the elements 3 are arranged, with respect to each other, in the direction of flow of the entering air, in a helical pattern which may or may not be variable; in which each element is always positioned uniformly staggered behind the preceding element, in which case the side from which the air flows in can be considered the front side.

These elements 3 are or may be entirely or partially constructed of aramide and possess, as a whole or in part, a section according to FIG. 3, although a section according to FIG. 4 can also be used expediently.

It is obvious that the elements (FIG. 8) are or may also be constructed of filaments or fibres 4 which are held together by a binder possibly based on a polymer. Instead of filaments or fibres, films can also be assembled in this way. The binder can be a plastic binder 5 or some other type of binder, provided that these are resistant to temperatures of at least +150° C. and at least to temperatures of −50° C. and sufficiently elastic. The fibres or filaments can consist of carbon or metal or plastics.

FIG. 2a shows elements 3 of, for example, aramide which intersect and are positioned in one plane.

In order to suppress the possible unacceptable air resistance of the points of intersection, it is advisable to use a construction as shown in FIG. 2b.

The guard elements 3 can advantageously be situated in different planes 6, 6a, 6b in a form in which they do or do not intersect, in order to obtain an optimum guard.

FIG. 3 shows a specified favourable aerodynamic section and FIG. 4 shows another section of the elements 3.

FIG. 5 shows a view of a guard element being twistable about its longitudinal axis with the fastening points 7 and 7'. It is obvious that the parts 3a, 3b and 3c of element 3 are aerodynamically shaped. In this context and in the other sections of the description aerodynamic means that the guard elements possess a design such that these elements do not exert any unacceptable disturbing influence on the air stream which flows along said elements to the engine to be protected during the operation of the engine.

In order to ensure that no damage is caused in the event of breakage of an element, it is advisable that an element is constructed such that in the event of breakage, seen in longitudinal direction, it breaks at an essentially predetermined position 8.

The two ends 7, 7' can be rounded because they are taken up in the casing construction of the air inlet, outside the air stream.

The parts 3a and 3b of the element shown in FIG. 5 can rotate independently of each other, due to the middle part 3c which, can be made thinner if required, and possibly more or less round, along with and adapting to the angle of incidence of the air stream which enters the turbo power source and passes the elements 3.

The construction of the parts 3a, 3b and 3c shown in FIG. 5 and the ends 7, 7' should preferably be chosen such that each imaginary section of the element which folds within the air stream, can adapt as well as possible to the local angle of incidence of this air stream.

The most expedient dimension of the aerodynamically shaped elements is dependent upon various factors such as the type of the turbo-engine and the requirements set.

FIG. 9 shows a view of parts 9' and 9" which have resulted through breakage of an element 3, the part 9' after the breakage having been shortened by assuming, for example, a spiral shape.

Figure 10:
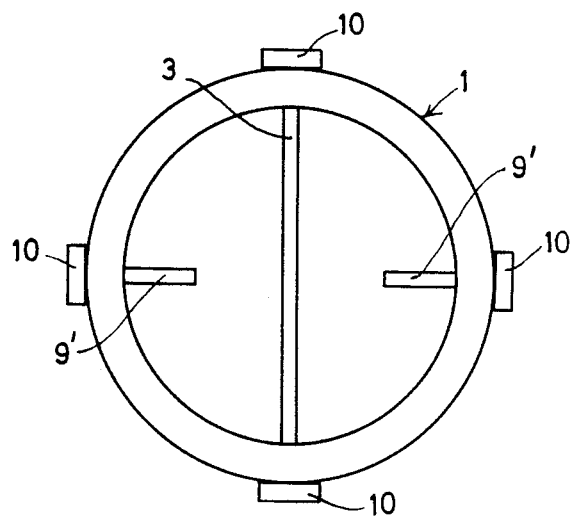
FIG. 10 shows another construction of a guard element.

Finally, FIG. 10 shows a wind-up member 10 under spring tension which can pull a part 9' out of the air stream after breakage.

It is self-evident that the wind-up member 10 can also hold an unbroken element 3 under a specified pretension. This embodiment is particularly suitable for elements 3 made of metal.

The guard elements 3, as a whole or in part, can possess a cross-section as shown in FIGS. 3 and 4 or a combination thereof.

Since carbon fibres are also very strong this fibre can also be used for manufacturing the guard elements 3, despite the fact that the carbon fibre possesses other values in respect of strength, stretch and resilience as compared with the abovementioned plastics or the fibres or wires manufactured therefrom.

What is claimed is:

1. Turbo-engine guard (2) for mounting on the air inlet (1) side of a turbo-engine, particularly for aeroplanes, characterized in that the turbo-engine guard comprises guard elements (3) having an aerodynamic shape being chosen such that elements and element parts do not exert any unacceptable disturbing influence on the air stream flowing along side elements to the turbo-engine to be protected to each other in the direction of flow of the entering air in a helical pattern, characterized in that the elements (3) are provided with a weaker portion, allowing said elements to break substantially at a predetermined position.

2. Turbo-engine guard (2) for mounting on the air inlet (1) side of a turbo-engine, particularly for aeroplanes, characterized in that the turbo-engine guard comprises guard elements (3) having an aerodynamic shape being chosen such that elements and element parts do not exert any unacceptable disturbing influence on the air stream flowing along side elements to the turbo-engine to be protected, wherein said guard elements are arranged with respect to each other in the direction of flow of the entering air in a helical pattern, characterized in that the guard elements (3) are provided with internal retracting stresses causing retraction of a broken part of, said guard elements at one end in case of breakage of the guard elements so that the resultant parts undergo an expedient shortening to a length which is less than the distance between those parts of the turbo-engine which rotate when the turbo-engine is in operation and the location at which this resultant broken part is retained.

3. Turbo-engine guard (2) for mounting on the air inlet (1) side of a turbo-engine, particularly for aeroplanes, characterized in that the turbo-engine guard comprises guard elements (3) having an aerodynamic shape being chosen such that elements and element parts do not exert any unacceptable disturbing influence on the air stream flowing along side elements to the turbo-engine to be protected, wherein said guard elements are arranged with respect to each other in the direction of flow of the entering air in a helical pattern, wherein the guard elements (3) are provided with internal contracting stresses causing contraction of a broken part of said guard elements in case of breakage of same so that said resultant broken part is subjected to an expedient shortening to a length being less than the distance between the rotating parts of the turbo-engine when being in operation and the location at which this broken resultant part is retained, said stresses leading to a spiral winding of a free end of the broken part.

4. Turbo-engine guard (2) for mounting on the air inlet (1) side of a turbo-engine, particularly for aeroplanes, characterized in that the turbo-engine guard comprises guard elements (3) having an aerodynamic shape being chosen such that elements and element parts do not exert any unacceptable disturbing influence on the air stream flowing along side elements to the turbo-engine to be protected, wherein said guard elements are arranged with respect to each other in the direction of flow of the entering air in a helical pattern, wherein the guard elements (3) are made, at least partially, of a plastic material of the poly-p-phenyleneterephthalamide type.

* * * * *

UNITED STATES PATENT AND TRADEMARK OFFICE
CERTIFICATE OF CORRECTION

PATENT NO. : 4,833,879
DATED : May 30, 1989
INVENTOR(S) : Norbertus VERDUYN et al It is certified that error appears in the above-identified patent and that said Letters Patent is hereby corrected as shown below:

IN THE CLAIMS:

Claim 1, Column 5, line 4, after "protected" insert --, wherein said guard elements are arranged with respect--.

Signed and Sealed this

Twenty-third Day of January, 1990

*Attest:*

JEFFREY M. SAMUELS

*Attesting Officer*   *Acting Commissioner of Patents and Trademarks*